Oct. 29, 1963   K. W. TANTLINGER ETAL   3,108,822
SEPARABLE EQUALIZED TANDEM AXLE WHEEL SUSPENSION
Filed Aug. 28, 1961   2 Sheets-Sheet 1
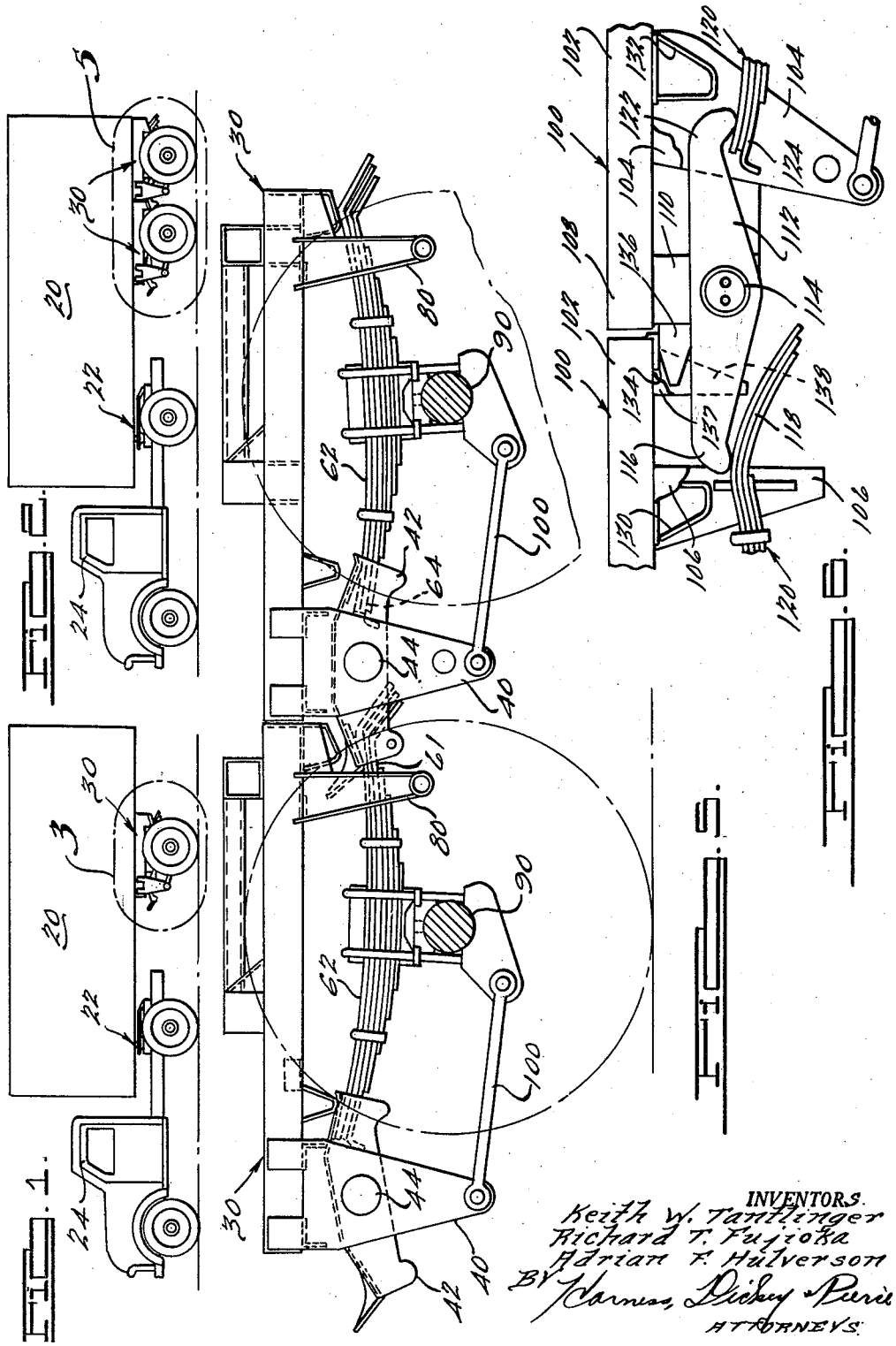
INVENTORS.
Keith W. Tantlinger
Richard T. Fujioka
Adrian F. Hulverson
BY Carness, Dickey & Pierce
ATTORNEYS

United States Patent Office 3,108,822
Patented Oct. 29, 1963

3,108,822
SEPARABLE EQUALIZED TANDEM AXLE
WHEEL SUSPENSION
Keith W. Tantlinger, Grosse Pointe Shores, Richard T. Fujioka, Oxford, and Adrian F. Hulverson, Drayton Plains, Mich., assignors to Fruehauf Trailer Company, Detroit, Mich., a corporation of Michigan
Filed Aug. 28, 1961, Ser. No. 134,250
1 Claim. (Cl. 280—104.5)

This invention relates generally to wheel suspensions and more particularly to separable equalized multiple axles for wheeled vehicles.

Heavy duty trailers of the type used for highway transport often employ a multiple axle wheel suspension comprising two or more spaced independently sprung axles having load-equalizing connections therebetween. Such multiple axle wheel suspensions substantially equalize the load on the axles during normal road operation. Conventionally, each axle has a pair of semi-elliptic springs fixedly secured thereto by, for example, U-bolt fasteners. Relatively simple torque arms maintain the axles in alignment. Generally, rockable equalizers engage adjacent ends of the front and rear semi-elliptic springs to equalize the load between the axles.

However, it often occurs that loading conditions of the trailer are such that multiple axles are not required. Heretofore, no provision was made for change-over between single and multiple axle wheel suspensions to accommodate changes in load, wherein load on the axles, in the multiple axle configuration, is equalized.

The present invention is directed to a wheel suspension comprising a plurality of like single axles that are usable individually as single axles or, alternatively, are joinable to form a load-equalizing multiple axle suspension. Further, coupling of the single axles automatically equalizes the load between the axles of the multiple axle suspension.

It is to be noted that the multiple axle suspension hereinafter described in detail is a tandem axle suspension. However, it will be obvious that the inveniton is applicable to effect equalization between any desired number of separable axles.

Accordingly, one object of the present invention is an improved multiple axle wheel suspension.

Another object is a separable equalized multiple axle suspension for a wheeled vehicle.

Another object is a single axle wheel suspension that is relatively easily coupled to a like single axle suspension to form a multiple axle suspension.

Another object is a single axle wheel suspension that is relatively easily coupled to a like single axle suspension to form a multiple axle suspension and wherein the load on the axles is automatically equalized upon coupling of the single axles.

Other objects and advantages of the present invention will be apparent in the following specification, claim and drawings, wherein:

FIGURE 1 is a side elevational view of a truck and trailer utilizing a single axle wheel suspension in accordance with an exemplary embodiment of the present invention;

FIG. 2 is a side elevational view similar to FIGURE 1 with a second axle joined to the first axle to form an equalized tandem axle suspension;

FIG. 5 is a sectional view taken within the circle "5" of FIG. 2 showing a pair of single axles coupled in load-equalizing relationship to form a tandem axle suspension; and FIG. 6 is a fragmentary view of a modified coupling between the yoke and spring of adjacent single axle suspensions.

Figure 3:
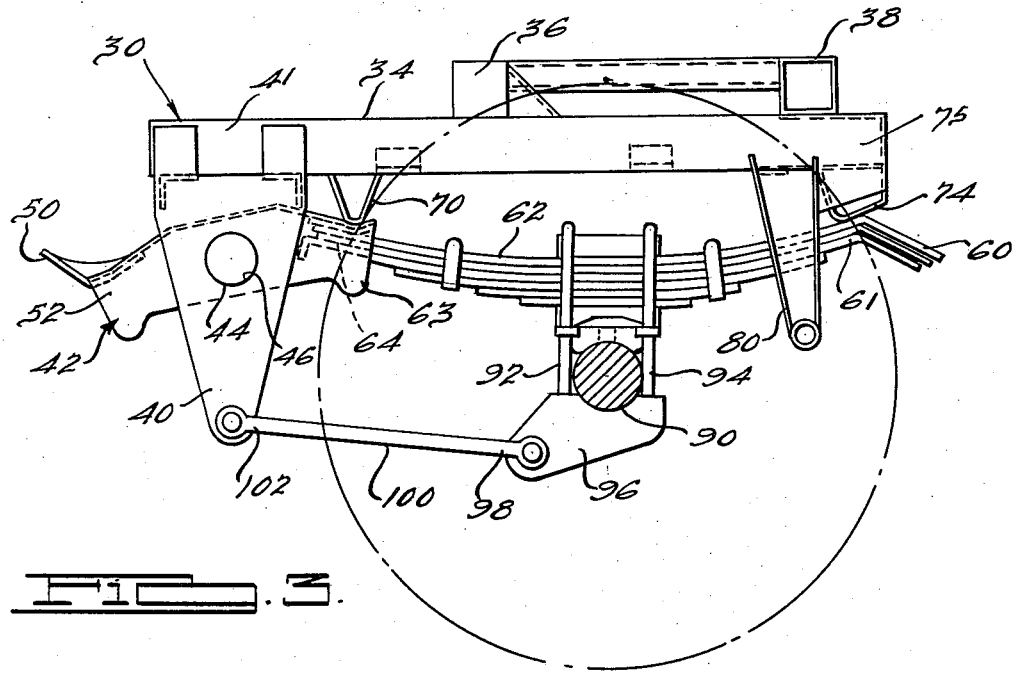
FIG. 3 is a sectional view taken within the circle "3" of FIGURE 1.

Referring to FIGURE 1 of the drawing, a trailer 20 is coupled through a fifth wheel 22 to a tractor 24 in the conventional manner. The trailer 20 is supported by a single axle wheel suspension 30, which is secured thereto by any suitable means.

When loading conditions of the trailer 20 require the addition of a second axle 30 to the trailer 20, coupling of the second single axle wheel suspension 30 to the trailer 20 and first axle 30 automatically effects equilization of the load between the coupled single axle suspensions 30.

As best seen in FIG. 3, a single axle wheel suspension 30 comprises a box-like frame defined by a pair of laterally spaced longitudinal stringers 34, one of which is shown, and transverse stringers 36 and 38. For the purpose of simplicity, the structure associated with only one of the stringers 34 will be described, it being understood that like assemblies are secured to each of the stringers 34.

A downwardly depending hanger 40 is secured to a front end 41 of the longitudinal stringer 34 for the support of a yoke 42. The yoke 42 is of generally U-shaped vertical transverse cross section, for a reason to be discussed. The yoke 42 is pivotally supported by a shaft 44 that is accepted in complementary apertures 46 in the hanger 40. The yoke 42 has an angularly upwardly extending plate 50 at a forward end 52 thereof to guide the yoke 42 over a complementary downwardly extending surface 60 on a rearward end 61 of a leaf spring 62, as will be described. The other end 63 of the yoke 42 accepts a front end portion 64 of the spring 62.

When the wheel suspension 30 is utilized as a single axle suspension, load is transferred in part from the stringer 34 to the spring 62 by a complementary bumper 70 that is secured to the longitudinal stringer 34 in superimposed relation to the front end portion 64 of the spring 62. Load is transferred to the rear end 61 of the spring 62 by a bumper 74 at a rearward end 75 of the longitudinal stringer 34. A downwardly depending bracket 80 maintains the end portion 61 of the spring 62 in alignment with the stringer 34.

A conventional axle 90 is secured to the spring 62 intermediate the ends 61 and 64 thereof as by a pair of U-bolts 92 and 94. A downwardly depending bracket 96 underlies the axle 90 and accommodates one end portion 98 of a radius rod 100, the other end portion 102 of which is pivotally secured to the hanger 40.

Figure 4:
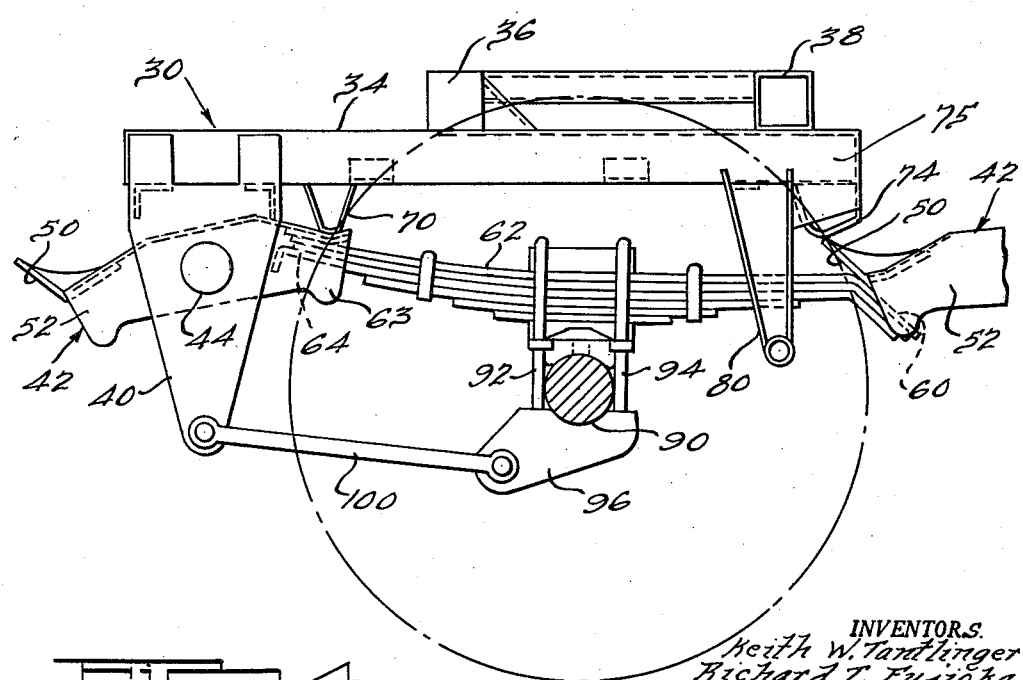
FIG. 4 is a sectional view similar to FIG. 3 showing the first step of coupling a second single axle suspension to the first axle suspension of FIG. 3.

As best seen in FIG. 4, a pair of single axle wheel suspensions 30 are coupled to form an equalized tandem axle wheel suspension by advancing the plate 50 of the yoke 42 on the rearward suspension 30 into engagement with the cam surface 60 on the rearward end 61 of the spring 62 of the front single axle wheel suspension 30. Thus, movement of the rearward wheel suspension 30 towards the frontal unit 30 biases the terminal end portion 61 of the spring 62 on the front unit 30 downwardly until the end portion 61 of the frontal spring 62 moves into the open end portion 52 of the yoke 42 on the rear wheel suspension 30.

As best seen in FIG. 5, the terminal end portion 61 of the spring 62 in the frontal axle unit 30 has moved into the open end portion 52 of the yoke 42, exerting a clockwise bias thereon about the pin 44 of the rearward axle unit 30. A balancing counter-clockwise torque is effected on the yoke 42 of the rearward axle unit 30 by the front end portion 64 of the spring 62 thereof. Thus, the yoke 44 on the rearward axle unit 30 carries an equalized load on opposite ends 52 and 63 thereof.

Referring now to FIG. 6 of the drawings, a pair of modified single axle wheel suspensions 100 are shown in the coupled condition to effect equalizing of a load thereon. Each single axle wheel suspension 100 comprises a frame portion 102, a downwardly depending front hanger 104, and a downwardly depending rear hanger 106. A forward portion 108 of each frame 102 is provided with a downwardly depending yoke support hanger 110, upon which a yoke 112 is pivotally supported as by a pin 114. When the single axle wheel suspensions 100 are coupled, as shown in FIG. 6, a forward end portion 116 of the yoke 112 engages a rear end portion 118 of a spring 120 on the front axle suspension 100. The rear end portion 122 of the yoke 112 engages a front portion 124 of a spring 120 on the rearward axle suspension 100. Thus, load on the springs 120 of the forward and rearward wheel suspensions 100 is equalized by engagement of the rear and front end portions 118 and 124 thereof, respectively, with the front and rear end portions 116 and 122 of the yoke 112. It is to be noted that the end portions 116 and 122 of the yoke 112 do not extend under the conventional bumpers 130 and 132 on the hangers 104 and 106, respectively, thereby simplifying the design of the suspensions 100 and maximizing the clearance for vertical movement of the ends 118 and 124 of the springs 120.

It is also to be noted that the forward wheel suspension 100 is provided with an alignment plate 134 that is engageable with a complementary alignment tongue 136 on the rearward wheel suspension 100 whereby, upon movement of the wheel suspensions 100 into juxtaposed relationship, the frame portions 102 thereof are aligned horizontally. The rearward portion of the frame 102 is also provided with a pair of downwardly depending members 137 and 138 on opposite sides of the alignment tongue 136 to effect lateral gathering of the suspensions 100 as they move into engagement with one another.

An important feature of the herein disclosed method of coupling to achieve equalization is that coupling is accomplished by the relative movement between axles, which can be produced by the tractive effort of the tractor. Thus, no power source other than the tractor is required to effect coupling or uncoupling of the single axle suspensions.

Also, it is to be noted that the single axle suspensions, when coupled in the multiple configuration, are "no hop" suspensions.

It is to be understood that the specific constructions of the improved separable equalized multiple axle wheel suspension herein disclosed and described are presented for the purpose of explanation and illustration and are not intended to indicate limits of the invention, the scope of which is defined by the following claim.

What is claimed is:

An equalized multiple axle wheel suspension comprising a pair of coupled substantially identical single axle wheel suspensions, said single axle wheel suspensions comprising, respectively, a frame, a pair of elliptical springs having end portions, respectively, engageable with said frame, laterally aligned end portions of said springs having downwardly extending cam surfaces thereon, respectively, a wheel supporting axle disposed intermediate the end portions of said springs, respectively, and supported thereby, and a pair of yokes pivotally supported by said frame and engageable with the opposite end portions of said springs, respectively, said yokes having upwardly directed cam faces thereon, respectively, engageable with the cam surfaces, respectively, on the end portions of the springs on another of said single axle wheel suspensions for biasing the end portions of the springs on the other of the wheel suspensions out of engagement with the frame of the other wheel suspension to equalize the load on the axles of said wheel suspensions upon movement of said suspensions into the coupled condition.

References Cited in the file of this patent

UNITED STATES PATENTS

| | | |
|---|---|---|
| 2,665,142 | Talbert | Jan. 5, 1954 |
| 2,912,251 | Warren | Nov. 10, 1959 |
| 3,004,772 | Bohlen | Oct. 17, 1961 |